United States Patent [19]

Varrasso

[11] Patent Number: 4,483,008
[45] Date of Patent: Nov. 13, 1984

[54] ARC GAP CONTROLLER FOR GLASS-MELTING FURNACE

[75] Inventor: Eugene C. Varrasso, Heath, Ohio

[73] Assignee: Owens-Corning Fiberglas Corporation, Toledo, Ohio

[21] Appl. No.: 342,856

[22] Filed: Jan. 26, 1982

[51] Int. Cl.³ ............................................. C03B 5/027
[52] U.S. Cl. ..................................................... 373/27
[58] Field of Search ...................... 373/27, 39, 40, 102, 373/104, 105, 106

[56] References Cited

U.S. PATENT DOCUMENTS

| | | | |
|---|---|---|---|
| 2,314,956 | 3/1943 | Slayter et al. | 373/40 |
| 2,904,718 | 9/1959 | Cooper et al. | 373/105 X |
| 3,414,657 | 12/1968 | Beck | 373/105 |
| 3,520,978 | 7/1970 | Svendsen | 373/105 |
| 3,767,832 | 10/1973 | Bennett | 373/105 |

Primary Examiner—Roy N. Envall, Jr.
Attorney, Agent, or Firm—Ronald C. Hudgens; Patrick P. Pacella; Ronald E. Champion

[57] ABSTRACT

A method of and apparatus for controlling the position of an electrode in relation to the upper surface of a body of molten glass in an arc glass-melting furnace comprising providing an alternating current of constant effective magnitude to the electrode, sensing the effective voltage supplied to the electrode, determining if the sensed voltage is within a predetermined range of voltages, and modifying the position of the electrode if the sensed voltage is not within the predetermined range of voltages.

8 Claims, 1 Drawing Figure

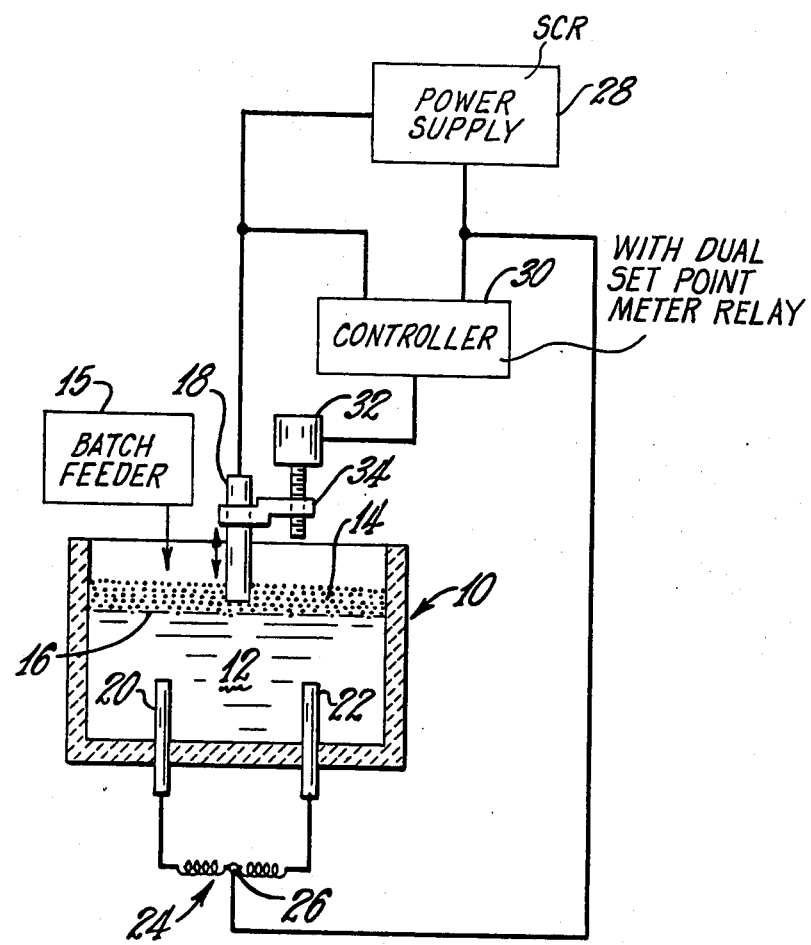

4,483,008

ARC GAP CONTROLLER FOR GLASS-MELTING FURNACE

BACKGROUND OF THE INVENTION

This invention relates to the production of glass fibers, e.g., fibers made by melting particulate batch ingredients or minerals, including basalt and the like, and, more particularly, to a method of and apparatus for controlling the positioning of an electrode in an arc furnace for producing such glass fibers.

SUMMARY OF THE INVENTION

In accordance with the present invention, there is provided a method of controlling the position of an electrode in relation to the upper surface of a body of molten glass in an arc glass-melting furnace. The subject method comprises the steps of providing an alternating current of constant effective magnitude to the electrode, sensing the effective voltage supplied to the electrode, determining if the sensed voltage is within a predetermined range of voltages, and modifying the position of the electrode if the sensed voltage is not within the predetermined range of voltages.

In addition, the invention provides an apparatus for controlling the position of an electrode in relation to the upper surface of a body of molten glass in an arc glass-melting furnace. The subject apparatus comprises means connected to the electrode for providing an alternating current of constant effective magnitude thereto; means for sensing the effective voltage supplied to the electrode by the current providing means; means associated with the sensing means for determining if the voltage sensed by the sensing means is within a predetermined range of voltages, the determining means being adapted to provide a control signal when the sensed voltage is not within the predetermined range of voltages; and means connected to the electrode and the determining means for modifying the position of the electrode in relation to the upper surface of the body of molten glass in response to the control signal.

The present invention is outstandingly adapted for controlling the arc gap, i.e., the distance between the electrode and the upper surface of the body of molten glass. An alternating current of constant effective magnitude, such as root-mean-square (RMS) or average current, is provided to the electrode by a power supply. The voltage applied to the electrode by the power supply is sensed to determine the magnitude of the arc gap, since the voltage applied is directly proportional to the magnitude of the impedance of such gap, which, in turn, is directly proportional to the distance between the upper surface of the molten glass and the electrode. To provide an efficient and effective melting operation, the arc gap must be maintained within a predetermined range to obtain a stable arc. The control systedm of the present invention compares the sensed voltage, which preferably is an RMS voltage, with a predetermined range of voltages.

If the sensed voltage is not within the predetermined range, the controller provides a suitable control signal to modify the position of the electrode so that the voltage is again within the predetermined range, thereby insuring that the distance between the electrode and the upper surface of the molten body of glass is within the desired range. If the sensed voltage is larger than the maximum voltage of the predetermined range, the control system provides a signal to reduce the distance between the electrode and the molten glass. Conversely, if the sensed voltage is less than the minimum voltge of the predetermined range, the control system provides a signal to increase the distance between the electrode and the molten glass. Accordingly, the present invention provides a constant amount of power to an arc glass-melting furnace, thereby maintaining a stable melting process.

Other objectives, advantages and applications of the present invention will be made apparent by the following detailed description of the preferred embodiment of the invention.

BRIEF DESCRIPTION OF THE DRAWING

The FIGURE is a schematic view in longitudinal cross section of an arc glass-melting furnace which utilizes the control system of the present invention.

DETAILED DESCRIPTION OF THE PREFERRED EMBODIMENT

Referring to the FIGURE, an arc glass-melting furnace utilizing the present invention is indicated generally by numeral 10. Furnace 10 contains a pool of molten glass 12 with a supply of batch material 14 lying on upper surface 16 of molten glass 12. Batch material 14 is supplied by batch feeder 15, which preferably is a batch feed system as disclosed in U.S. Pat. No. 4,385,918 to Charles S. Dunn and Stephen Seng, which was filed on the same day as the instant application and is assigned to a common assignee. An arc electrode 18 is positioned in furnace 10 such that its lower end is located above upper surface 16 of molten glass 12. Electrodes 20 and 22 are positioned through the bottom wall of furnace 10 into molten glass 12, such that they are axially and vertically equidistant from arc electrode 18. Electrodes 20 and 22 are connected to opposite ends of magnetic reactor 24, which, e.g., may consist of two coils wrapped on a common core with a center tap or node 26 connecting the coils. Node 26 is connected to one terminal of power supply 28, and arc electrode 18 is connected to the other terminal of power supply 28.

Power supply 28 provides a constant RMS current and may be, for example, a silicon controlled rectifier power supply manufactured by the Robicon Corporation of Pittsburgh, Pa. Controller 30 which may be a meter relay having a dual set point, such as those made by the LFE Company of Waltham, Mass., monitors the voltage across the terminals of power supply 28 and determines if this voltage is within a predetermined range of voltages, such range corresponding to a desired arc gap range. Controller 30 is electrically connected to drive motor 32 which is coupled to arc electrode 18 by arm 34. Preferably, drive motor 32 and arm 34 are an electrode feed mechanism as described in the copending U.S. patent application of Charles S. Dunn, Ser. No. 342,869, which was filed on the same day as the instant application and is assigned to a common assignee.

Power supply 28 causes an electric arc to form between arc electrode 18 and upper surface 16 of molten glass 12. The electric current passes through molten glass 12 to electrodes 20 and 22. Magnetic reactor 24 tends to balance the current flow through electrodes 20 and 22 to insure that a uniform temperature is established throughout molten glass 12, as described in detail in my copending U.S. patent application, Ser. No. 342,869 filed 1/26/82 now U.S. Pat. No. 4,435,811, which was filed on the same day as the instant application and is assigned to a common assignee.

If the voltage detected by controller 30 is greater than the maximum voltage of the predetermined range, controller 30 actuates drive motor 32 which causes arm 34 to lower arc electrode 18 towards upper surface 16 of molten glass 12 until the voltage is within the predetermined range. If the voltage detected by controller 30 is less than the minimum voltage of the predetermined voltage range, controller 30 actuates drive motor 32 to cause arm 34 to raise arc electrode 18 to increase the gap between arc electrode 18 and upper surface 16 until the voltage is within the predetermined range of voltages.

It is to be understood that variations and modifications of the present invention can be made without departing from the scope of the invention. It is also to be understood that the scope of the invention is not to be interpreted as limited to the specific embodiments as disclosed herein, but only in accordance with the appended claims when read in light of the foregoing disclosure.

I claim:

1. A method of controlling the position of an electrode in relation to an upper surface of a body of molten glass in an arc glass-melting furnace for maintaining a stable arc, said method comprising the steps of: providing an alternating current of constant magnitude to said electrode produced by a constant current producing power supply to cause a voltage drop across said arc electrode; sensing the voltage applied to said electrode in said current providing step; determining if the voltage sensed in said sensing step is within a predetermined range of voltages; and modifying the position of said electrode in relation to said upper surface of said body of molten glass if said sensed voltage is not within said predetermined range of voltages to bring said sensed voltage within said predetermined range of voltages.

2. A method as recited in claim 1, wherein said step of sensing the effective voltage applied to said electrode comprises sensing the root-mean-square voltage applied to said electrode.

3. A method as recited in claim 2, wherein said step of providing an alternating current of constant effective magnitude comprises providing a root-mean-square current of constant magnitude.

4. An apparatus for controlling the position of an electrode in relation to an upper surface of a body of molten glass in an arc glass-melting furnace to maintain a stable arc, said apparatus comprising: a constant current producing power supply means connected to said electrode for providing an alternating current of constant magnitude thereto to cause a voltage drop across said arc electrode; means for sensing the voltage applied to said electrode by said current providing means; means associated with said sensing means for determining if the voltage sensed by said sensing means is within a predetermined range of voltages, said determining means providing a control signal when said sensed voltage is not within said predetermined range of voltages; and means connected to said electrode and said determining mans for modifying the position of said electrode in relation to said upper surface of said body of molten galss in response to said control signal to bring said sensed voltage within said predetermined range of voltages.

5. An apparatus as recited in claim 4, wherein said sensing means senses the root-mean-square voltage applied to said electrode.

6. An apparatus as recited in clam 5, wherein said means for providing an alternating current of constant effective magnitude provides a root-mean-square current of constant magnitude.

7. An apparatus as recited in claim 6, wherein said determining means comprises a meter relay with first and second set points, said first set point enabling said relay to sense a maximum voltage and said second set point enabling said relay to sense a minimum voltage.

8. An apparatus as recited in claim 7, wherein said means for providing an alternating current of constant effective magnitude comprises a silicon controlled rectifier controlled power supply.

* * * * *